May 17, 1938.  D. E. LEWELLEN ET AL  2,117,485
VARIABLE SPEED DEVICE
Filed Oct. 11, 1935   3 Sheets-Sheet 1
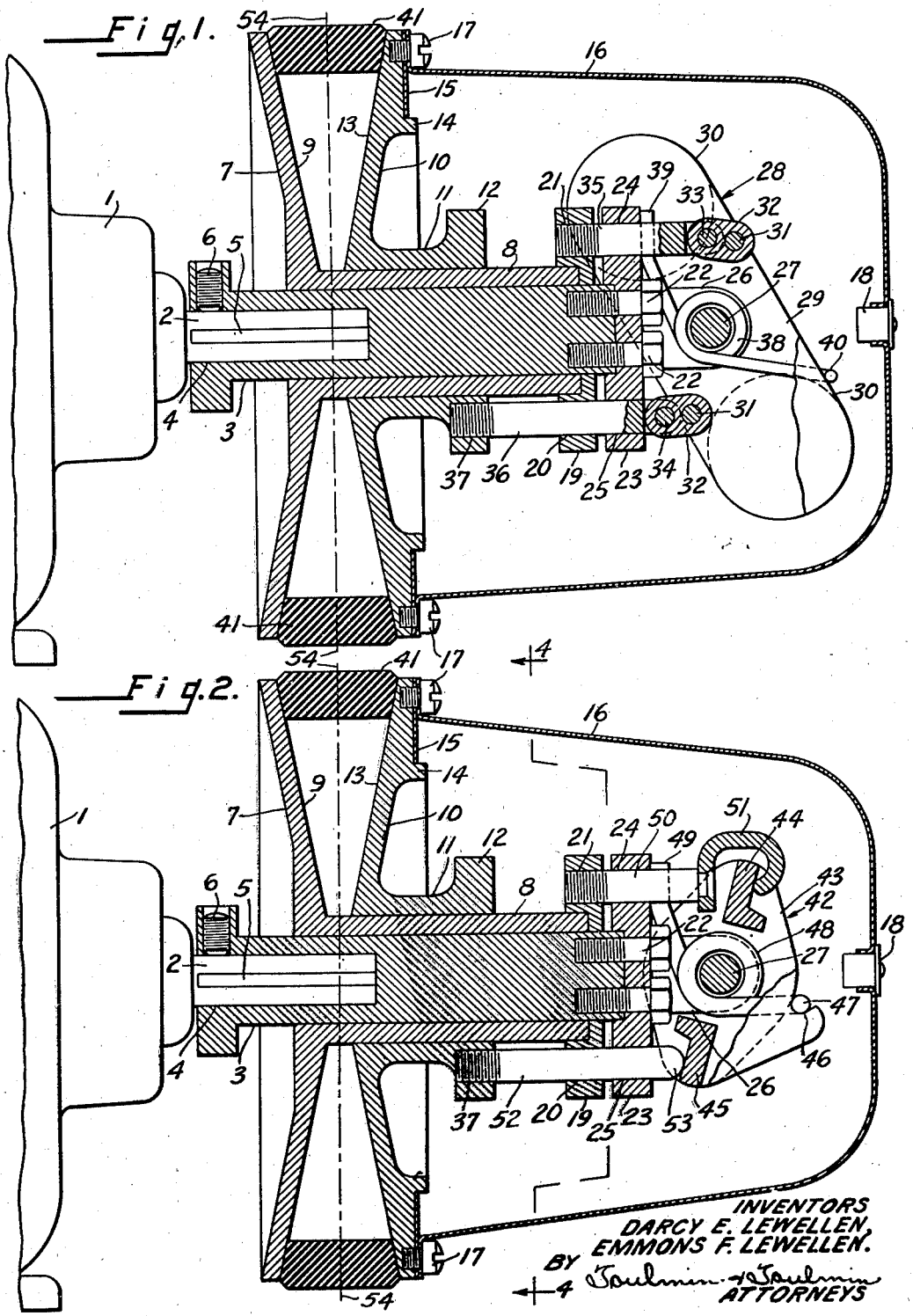
INVENTORS
DARCY E. LEWELLEN,
EMMONS F. LEWELLEN.
BY Toulmin & Toulmin
ATTORNEYS May 17, 1938.  D. E. LEWELLEN ET AL  2,117,485
VARIABLE SPEED DEVICE
Filed Oct. 11, 1935  3 Sheets-Sheet 2

INVENTORS
DARCY E. LEWELLEN,
EMMONS F. LEWELLEN.
BY Toulmin & Toulmin
ATTORNEYS

INVENTORS
DARCY E. LEWELLEN,
EMMONS F. LEWELLEN.
BY Toulmin & Toulmin
ATTORNEYS

Patented May 17, 1938

2,117,485

UNITED STATES PATENT OFFICE 2,117,485

VARIABLE SPEED DEVICE

Darcy E. Lewellen and Emmons F. Lewellen, Columbus, Ind.

Application October 11, 1935, Serial No. 44,594

4 Claims. (Cl. 74—230.17)

This invention relates to devices for obtaining variable speeds, and in particular, to variable speed devices having separable pulley halves, whereby the effective driving diameter of the pulley may be varied by separating the halves.

One object of this invention is to provide a variable speed device having pulley halves slidable toward and away from one another, together with yielding means for urging the halves toward one another regardless of whether the device is at rest or in motion.

Another object is to provide a variable speed device with relatively slidable pulley halves, wherein yielding means, such as a spring, is employed to urge the pulley halves toward one another, and centrifugally-responsive means is additionally supplied to urge the pulley halves together during the operation of the device.

Another object is to provide a variable speed device consisting of a shaft with a pulley half having a sleeve-like hub and a second pulley half slidable therealong, together with mechanism interconnecting the halves so as to move them toward and away from one another, and yielding means, such as a spring, with or without a centrifugally-responsive device for urging the pulley halves toward one another.

In the drawings:

Figure 1 is a central vertical section through the variable speed device of this invention, employing a centrifugal member and a spring, with a corner of the centrifugal member in side elevation to show the spring connection.

Figure 2 is a central vertical section through a modified form of variable speed device, wherein the centrifugal member is virtually omitted and a spring employed to impart substantially the entire moving force to the pulley halves.

Figure 3:
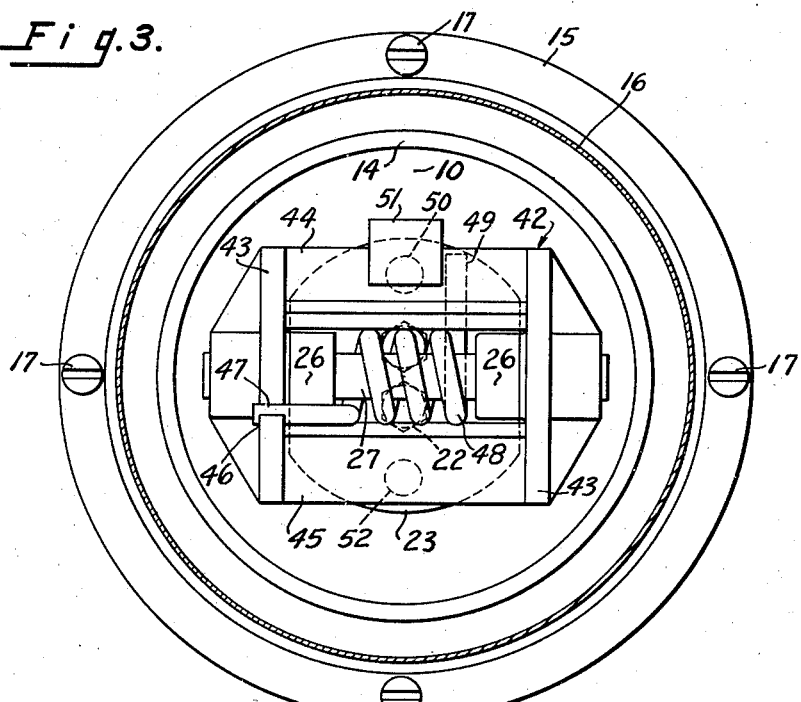
Figure 3 is a right-hand end elevation of Figure 2, with the casing cut away to disclose the internal parts.

In general, the variable speed device of this invention consists of a shaft with a pair of conical pulley halves slidable therealong and interconnected by mechanism, a part of which consists of a spring arranged to force the pulley halves toward one another. This spring tends to force the halves together regardless of whether the device is at rest or in motion. Centrifugally-responsive means is optionally provided to urge the pulley halves together while the machine is in motion and thus assist the action of the spring. In the former case the spring accomplishes the entire action of urging the pulley halves together, whereas in the latter case the centrifugal means accomplishes the major part of the urging, the spring being used merely to urge the pulley halves together while the machine is at rest and to prevent the belt from wedging the pulley halves apart.

Referring to the drawings in detail, Figure 1 shows in central vertical section the variable speed device of this invention. A motor 1 with a drive shaft 2 carries a hollow shaft 3, having a socket 4 for receiving the motor drive shaft 2. A key 5 and a set screw 6 firmly secure the hollow shaft 3 to the motor drive shaft 2. Mounted on the hollow shaft 3 is a pulley half 7 having a sleeve-like hub 8 extending along the shaft 3. The pulley half 7 is provided with a conical inner face 9.

Slidably mounted upon the sleeve-like hub 8 is a second pulley half 10 having a hub 11 with a collar-like portion 12 integral therewith. The pulley half 10 has a conical inner face 13 tapering in the opposite direction from the pulley face 9. The pulley half 10 is provided with an annular ridge 14, which serves to form an abutment for the flange 15 of a casing 16 secured thereto by means of the screws 17. The casing 16 is provided with an oiling arrangement 18, whereby oil may be inserted in the casing.

The sleeve-like hub 8 of the pulley half 7 carries a collar 19 secured thereto, and provided with a smooth bore 20 and a threaded bore 21 on opposite sides thereof. Secured to the end of the hollow shaft 3, as by the cap screws 22, is a disc 23 having bores 24 and 25 on opposite sides thereof. The disc 23 is provided with a pair of bosses 26, bored to receive a cross shaft 27. Mounted on the cross shaft 27 is a centrifugal member, generally designated 28, and roughly H-shaped. The centrifugal member 28 is provided with side arms 29 with counterweights 30 at the opposite ends thereof.

Extending between the side arms 29 are rods 31 (Figure 1) pivotally supporting links 32, whereby they are connected to the pivot pins 33 and 34 mounted upon the ends of the rods 35 and 36, respectively. The rod 35 passes loosely through the bore 24 in the disc 23, and its opposite end is threaded into the bore 21 in the collar 19 on the end of the sleeve-like hub 8 of the pulley half 7. Similarly, the rod 36 passes loosely through the bores 25 and 20 in the disc 23 and collar 19, respectively, and its opposite end is threaded into a threaded bore 37 in the collar-like portion 12 of the pulley half 10. A coil spring 38 is arranged around the cross shaft 27. One end 39 of the coil spring 38 rests against the disc 23, whereas the opposite end 40 engages one of the side arms 29 of the H-shaped centrifugal member 28.

A belt 41, having V-shaped side walls, is employed in connection with the variable speed device of this invention, and engages the conical faces 9 and 13 of the pulley halves 7 and 10. The belt 41 is preferably of an endless type, and at its opposite end engages either a V-grooved or other suitably faced pulley upon another shaft, preferably parallel to the hollow shaft 3. When the distance between the hollow shaft 3 and the drive shaft is varied, it will be obvious that the belt 41, being of constant length, will come to rest at different distances from the axis of rotation of the hollow shaft 3 so that the pulley halves 7 and 10, in effect, form a pulley of variable diameter.

In the operation of the device shown in Figure 1, the coil spring 38 normally urges the pulley halves 7 and 10 toward one another through the connections previously described, regardless of whether the device is at rest or in motion. When the device is in motion, however, the centrifugal member 28 comes into operation and tends to swing upwardly toward a vertical position (Figure 1) as the speed of the shaft 3 increases. The more rapid the rotation of the shaft the greater is the centrifugal force created in the rotation of the centrifugal member 28, and the stronger is the force urging the pulley halves 7 and 10 together against the opposite sides of the belt 41.

Figure 4:
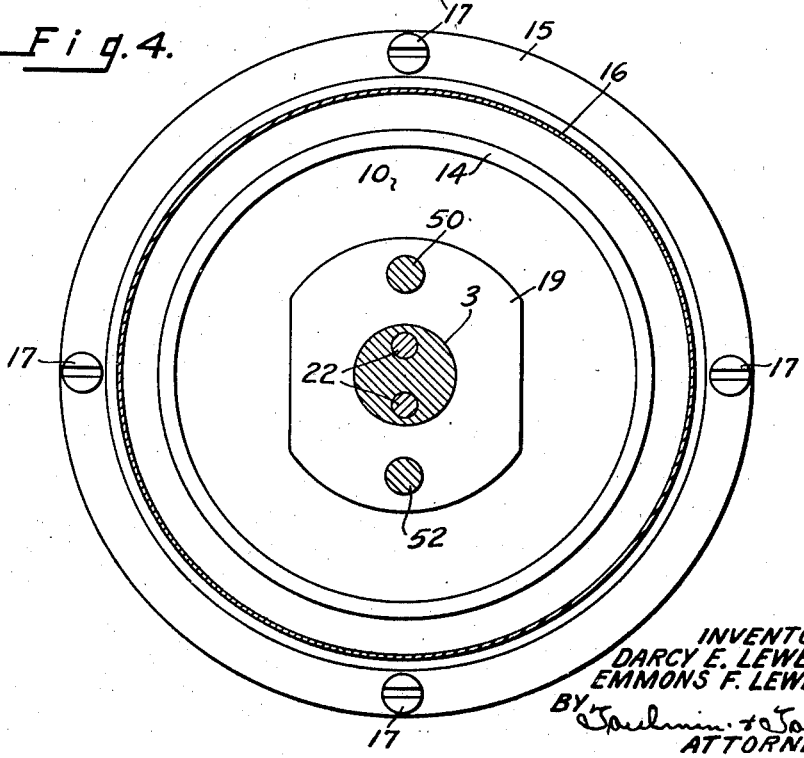
Figure 4 is a cross section along the line 4—4 of Figure 2.

In the modified form of variable speed device shown in Figures 2 to 4, inclusive, the various parts are generally similar to those of the device shown in Figure 1, and such similar parts bear similar reference numerals. It will be observed, however, that the centrifugal member 28, with its side arms 29 carrying the counterweights 30, has been omitted and replaced by a rectangular member, generally designated 42, having side arms 43 interconnected by the cross arms 44 and 45, of approximately L-shaped cross section. The side arms 43 are bored to receive the cross shaft 27 and mounted thereon.

The left-hand side arm 43 (Figures 2 and 3) is provided with a slot 46 arranged to receive one end 47 of a coil spring 48, the opposite end 49 of which engages the disc 23. The coil spring 48, as shown in Figure 2, is a much stronger spring than the coil spring 38 shown in Figure 1, and delivers a much more powerful thrust because it is not assisted by a centrifugally-responsive member, as is the case with the coil spring 38 of Figure 1. Secured to the outer end of the upper rod 50, in Figure 1, is a hooked portion 51 extending over the upper L-shaped cross arm 44. The lower rod 52, however, is provided with a rounded outer end 53, engaging the lower L-shaped cross arm 45. With these exceptions the rods 50 and 52 are similar in form and function to the rods 35 and 36 of Figure 1.

In the operation of the modified form of variable speed device shown in Figures 2 to 4, inclusive, the heavy coil spring 48 constantly urges the pulley halves 7 and 10 toward one another and into engagement with the side walls of the belt 41, irrespective of whether the hollow shaft 3 is at rest or in rotation. The rectangular member 42 has comparatively small centrifugal effect, as compared with the centrifugal member 28 of Figure 1, hence, the centrifugal force exerted by it is small compared with the thrust of the spring 48. Consequently, the spring 48 of Figure 2 is principally relied upon to maintain the pulley halves 7 and 10 in engagement with the belt 41. The latter may be caused to engage the pulley halves 7 and 10 on different diameters by changing the distance between the hollow shaft 3 and the shaft on which the driven pulley is mounted, in the manner described above.

As the distance between the driving and driven shafts is increased, the length of the belt 41 remaining the same, the belt 41 will be wedged inwardly, thereby forcing the pulley halves 7 and 10 apart against the thrust of the coil spring 48. In Figure 1, however, this thrust consists of the combined effects of the coil spring 38 and the centrifugal member 28. If the distance between the driving and driven shafts is shortened, however, the belt 41 will engage the pulley halves 7 and 10 upon a larger diameter, thereby permitting the pulley halves to be urged toward one another under the influence of the coil spring 48 of Figure 2, or of the combined coil spring 38 and centrifugal member 28 of Figure 1.

It will be obvious that the variable speed device of Figure 2 may be provided with the links 32 interconnecting the ends of the rods 50 and 52, with the rectangular member 42 instead of the hook 51 and rounded end 53 shown. The construction would be similar to that shown in Figure 1.

It will be observed that the pulley halves 7 and 10 are moved at equal speeds in opposite directions toward or away from the median plane 54, this median plane coinciding with the center line of the belt 41. The center line of the belt 41 will therefore remain in a fixed position, regardless of the position to which the device is adjusted and regardless of the diameter upon which the belt 41 is running. This feature is important because it permits the belt 41 to be operated in connection with a narrow faced driven pulley without the necessity of providing enough width of face to allow the belt to slide along the pulley, as would be the case if the pulley halves 7 and 10 moved at different speeds, or if one only of these halves were movable.

Figure 5:
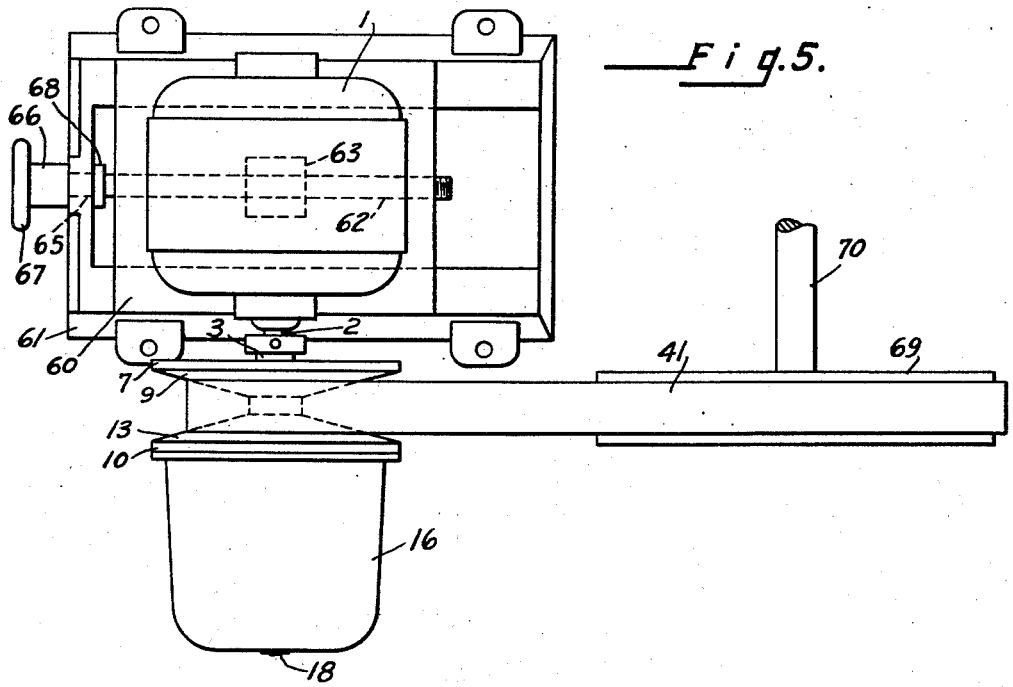
Figure 5 is a top plan view of a variable speed unit employing the variable speed device of our invention, in conjunction with means for changing the distance between the driving and driven shafts.

The variable speed device of this invention may be employed in conjunction with any means for varying the diameter upon which the belt will engage the pulley. In Figure 5 is shown a typical means for accomplishing this result. Figure 5 shows the motor 1 of the variable speed device mounted upon a movable slide 60, which is dovetailed into a base 61 to reciprocate therein. A screw shaft 62 engages a nut 63 attached to the bottom of the movable slide 60. The screw shaft 62 is supported in the base 61 at one end, as at 65, and at the other end is free. A collar 66 having a hand wheel 67 is mounted upon one end of the screw shaft 62 and enables the latter to be rotated, thereby causing the nut 63 and the slide 60 to be moved to and fro. A collar 68 on the screw shaft 62 cooperates with the collar 66 to prevent the screw shaft 62 from being moved longitudinally while it is being turned.

The belt 41 is arranged to drive a driven pulley 69 upon a driven shaft 70, preferably parallel to the hollow shaft 3. Consequently, when the hand wheel 67 is rotated the distance between the driving shaft 3 and the driven shaft 70 is altered. As the belt 41 has a fixed length and the pulley 69 a fixed diameter, the changing of the distance between the shafts will cause the belt 41 to move the pulley halves 7 and 10 and engage them upon a different diameter, thereby varying the speed of the driven shaft 70.

Figure 6:
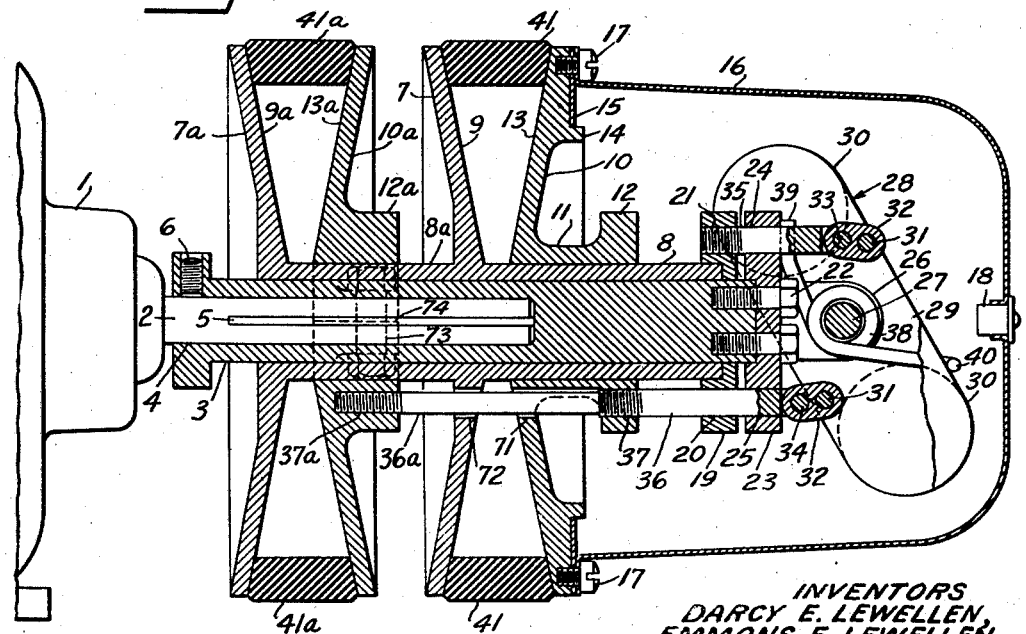
Figure 6 is a central vertical section through a modified variable speed device employing a plurality of variable diameter pulleys.

The modified form of variable speed pulley shown in Figure 6 employs a plurality of sets of pulley halves with a plurality of belts, two sets being shown in the drawings. A greater number of sets of pulleys, however, may obviously be used. In the construction shown in Figure 6, as compared with Figure 1, the sleeve-like hub of the pulley half 7 has been extended in the opposite direction along the hollow shaft 3 in an extended portion 8a. The latter is provided with a second pulley half 7a having a conical inner surface 9a, similar to the inner surface 9 of the pulley half 7.

Mounted on the pulley hub extension 8a is a second opposing pulley half 10a having a conical inner surface 13a, similar to the inner surface 13 of the opposing pulley half 10. The pulley half 10a, however, is split diametrically, as at 74, and the halves united by the bolts 73 (one being shown) for purposes of convenience of assembly. The pulley half 10a, however, is slidable along the pulley hub extension 8a in a manner similar to the pulley half 10 along the hub 8. The motion of the hub 8 by the rod 35 also obviously moves the second pulley half 7a because this is integral with the extension 8a, which in turn, is integral with the hub 8 carrying the pulley half 7. The rod 36, however, which is threaded into the bore 37 in the collar 12 of the pulley half 10 continues onward in a reduced diameter extension 36a, passes through the holes 71 and 72 in the pulley halves 10 and 7, respectively, and terminates in the threaded bore 37a in the hub 12a of the second opposing pulley half 10a.

The mechanism in the extreme right side of Figure 6 for moving the pulley halves toward and away from one another is the same as that shown in Figure 1, and has a similar mode of operation. It will be observed, however, that when the rods 35 and 36 are moved by the spring 38 of the centrifugally-responsive member 28, the pulley halves 7 and 7a will move in unison in one direction, whereas the pulley halves 10 and 10a will move in unison in the opposite direction and by equal amounts in an equal period of time, hence, at equal speeds. By this means it is possible to employ two or more variable diameter pulleys driving two or more belts 41 and 41a, and yet accurately control the diameters upon which these belts will engage the pulleys. It will furthermore be obvious that the mechanism shown at the extreme right-hand side of Figure 2 may be substituted for the mechanism shown in the same location in Figure 6 so that the pulley halves are moved toward and away from one another primarily by the spring rather than by the centrifugally-responsive member and the spring.

We desire to comprehend within our invention such modifications as may be embraced within our claims and the scope of our invention.

Having thus fully described our invention, what we claim as new and desire to secure by Letters Patent, is:

1. A variable speed device comprising a shaft, means to rotate said shaft, a pulley half having an extended hub slidably mounted on said shaft, a second pulley half having a hub slidably mounted on the hub of said first pulley half, a tie member extending longitudinally from each pulley hub, a connecting member, means on the end of said shaft substantially in the vicinity of the axis thereof for pivotally supporting said connecting member, a coil spring surrounding the pivot of said connecting member, and means operatively engaging said tie members with said connecting member, said coil spring being operatively connected to said connecting member for urging said pulley halves toward one another.

2. A variable speed device comprising a shaft, means to rotate said shaft, a pulley half having an extended hub slidably mounted on said shaft, a second pulley half having a hub slidably mounted on the hub of said first pulley half, a tie member extending longitudinally from each pulley hub, a connecting member, means on the end of said shaft substantially in the vicinity of the axis thereof for pivotally supporting said connecting member, a coil spring surrounding the pivot of said connecting member, means operatively engaging said tie members with said connecting member, said coil spring being operatively connected to said connecting member for urging said pulley halves toward one another, and centrifugally-responsive means attached to said connecting member and adapted during rotation to urge said pulley halves toward one another and amplify the action of said coil spring.

3. A variable speed device comprising a shaft, means to rotate said shaft, a pulley half having an extended hub slidably mounted on said shaft, a second pulley half having a hub slidably mounted on the hub of said first pulley half, a tie member extending longitudinally from each pulley hub, a pivot member mounted on said shaft, a connecting member pivotally mounted on said pivot member, means operatively engaging said tie members with said connecting member at opposite sides of said pivot member, and yielding means urging said connecting member in a direction adapted to urge said pulley halves toward one another.

4. A variable speed device comprising a shaft, means to rotate said shaft, a pulley half having an extended hub slidably mounted on said shaft, a second pulley half having a hub slidably mounted on the hub of said first pulley half, a tie member extending longitudinally from each pulley hub, a pivot member mounted on said shaft, a connecting member pivotally mounted on said pivot member, means operatively engaging said tie members with said connecting member at opposite sides of said pivot member, yielding means urging said connecting member in a direction adapted to urge said pulley halves toward one another, and centrifugally-responsive means attached to said connecting members and adapted during rotation to urge said pulley halves toward one another and amplify the action of said yielding means.

DARCY E. LEWELLEN.
EMMONS F. LEWELLEN.